June 10, 1958 R. ADLER ET AL 2,838,668

FREQUENCY DISCRIMINATION SYSTEM

Filed Jan. 2, 1957 2 Sheets-Sheet 1

INVENTORS
Robert Adler
John G. Spracklen
by John J. Pederson
Attorney

June 10, 1958 R. ADLER ET AL 2,838,668

FREQUENCY DISCRIMINATION SYSTEM

Filed Jan. 2, 1957 2 Sheets-Sheet 2

INVENTORS
Robert Adler
John G. Spracklen
by John J. Pederson
Attorney 2,838,668

FREQUENCY DISCRIMINATION SYSTEM

Robert Adler, Northfield, and John G. Spracklen, Chicago, Ill., assignors to Zenith Radio Corporation, a corporation of Illinois Application January 2, 1957, Serial No. 632,124
8 Claims. (Cl. 250—27)

Figure 1:
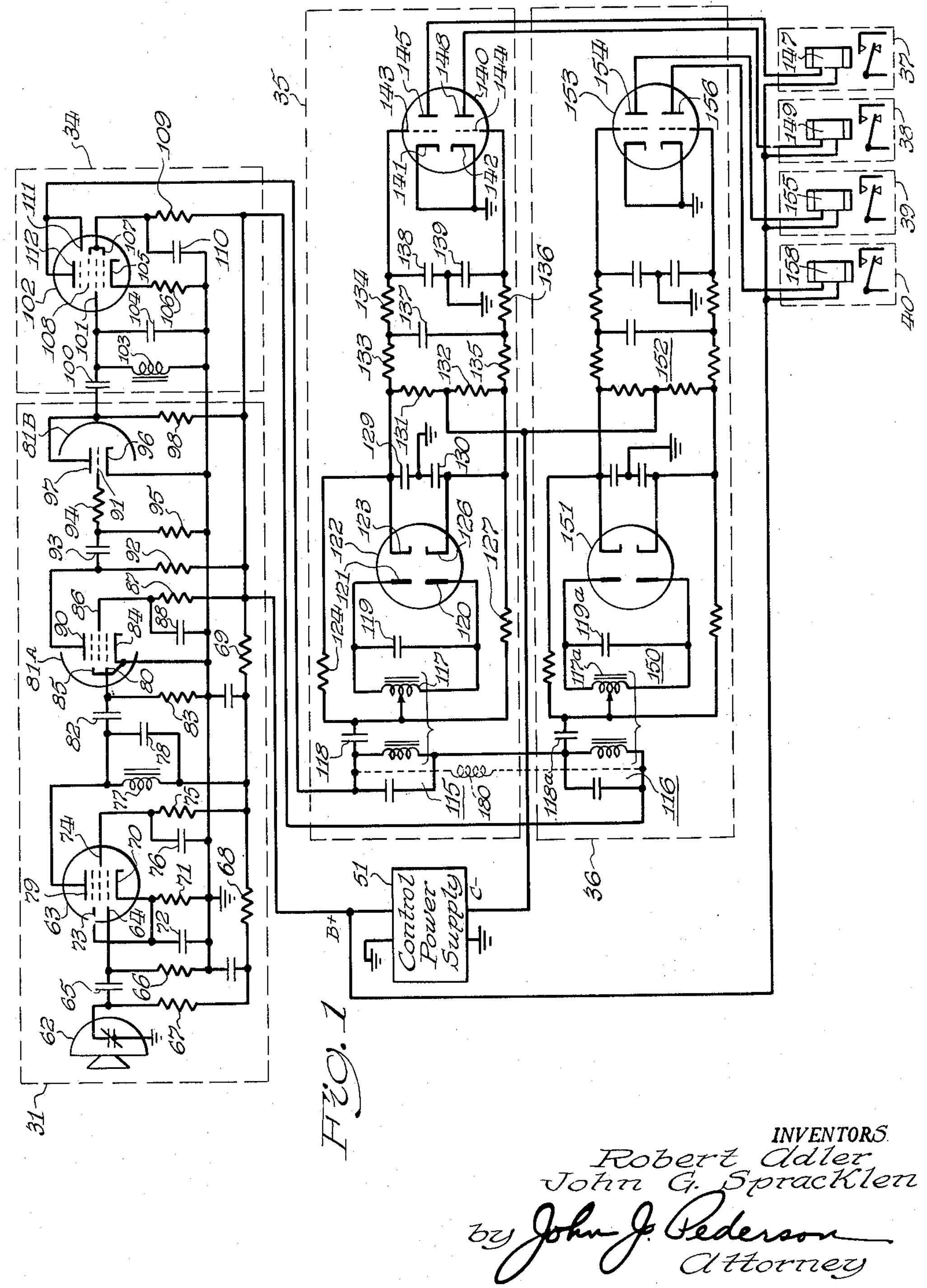

This invention is directed to a new and improved frequency discrimination system for use with an electrical control circuit. The system is particularly valuable when applied to control of one or more electrical circuits in a wave-signal receiver such as a television receiver, and is described in that connection; it is not, however, restricted to this particular use, but may be employed in controlling apparatus in a wide variety of applications. This application is a continuation-in-part of a copending application of Robert Adler, Serial No. 578,333, filed April 16, 1956, for Control System, and assigned to the same assignee.

There are many different types of electrical or electrically-controlled apparatus for which convenience and efficiency of operation may be greatly enhanced by a remote control system. For example, a television receiver is best utilized when the observer is seated at a substantial distance from the receiver, thus making it relatively inconvenient to change the station or signal channel to which the receiver is tuned when a change in programs is desired, to change the amplitude of sound from the receiver, to turn the receiver on and off, etc. Accordingly, it is highly desirable to provide a system to regulate the receiver operation without requiring the observer to leave the normal viewing position. Similarly, it is frequently desirable to provide for remote control of doors, as on a garage, of heating apparatus, such as a furnace, and of other similar electrical or electrically-controlled devices. In many of these applications, it is undesirable to have a direct cable connection from the remote control station to the controlled device, since a wire or cable link is not particularly attractive in appearance and may often cause accidents when extended transversely of an area where people must walk.

Remote control systems in which operating characteristics of a radio or television receiver or other device are varied in response to radio, acoustic, or light signals have been employed in the past. Those systems which utilize a portable miniature radio transmitter have generally been unsatisfactory in that the control system may be triggered to change the operating characteristics of the controlled device by signals emanating from sources other than the control transmitter. Radio-linked remote control systems frequently create objectionable interference in other wave-signal receivers; they also tend to be relatively complex and expensive to manufacture and require batteries or some other source of electrical power at the transmitter.

Light impulse actuated systems are generally effective in operation, but frequently are relatively expensive, particularly where a number of different electrical circuits are to be controlled, since the photo-sensitive devices employed at the receiving station of the system are relatively costly. Systems of this type are also sometimes subject to false actuation under adverse ambient lighting conditions.

Acoustic control systems, using signals in both the audible and ultra-sonic ranges, have been proposed many times but have not found general acceptance. This lack of acceptance is generally attributable to the fact that the amplitude of the signal received at the pick-up station of the system varies substantially as the distance between the transmitting and pick-up stations is changed. This factor tends to make a control system based upon amplitude modulation of an acoustic carrier quite erratic in operation. In addition, systems of this type are quite frequently subject to false triggering from extraneous acoustic signals.

These and other prior art disadvantages are overcome by the system described and claimed in the aforesaid copending application, a system which has achieved noteworthy commercial success since the filing of that application. In one embodiment of that inventive system, there are included a pair of frequency-discrimination devices which operate independently of each other but the inputs of which are coupled to a single, common signal-translating means in turn coupled to a source of signals to which the discriminators ultimately respond. While performance satisfactory for many purposes is obtained from that portion of the overall system including the two discriminators fed from a common preceding stage without any special coupling arrangement therebetween, it has been found that an imbalance may exist between the output signals developed by the two discriminator circuits; that is, for identical discriminator and coupling circuitry, the output signal amplitudes may be unequal even though the input signals are of equal strength.

It is accordingly a general object of the present invention to provide a frequency discriminator system which overcomes the above noted difficulty in a simple and inexpensive manner.

More specifically, it is an object of the present invention to provide a circuit in which a multiplicity of frequency-discrimination devices coupled to a common signal-translating means have identical performance characteristics.

Another object of the present invention is to provide a coupling arrangement between a signal-translating stage and a pair of frequency-discrimination devices which contributes effectively to balanced operation of the latter.

A frequency discrimination system in accordance with the present invention includes a signal source having an output circuit which presents a predetermined reactive impedance. A first frequency discrimination device is coupled to the output circuit; a second frequency-discrimination device is also coupled to the output circuit and is coupled to the first frequency-discrimination device by a reactive impedance substantially equal in magnitude and opposite in sign to the predetermined reactive impedance presented by the output circuit at the signal frequencies involved. Finally, the outputs of the frequency-discrimination devices are coupled to the utilization means.

Figure 2:
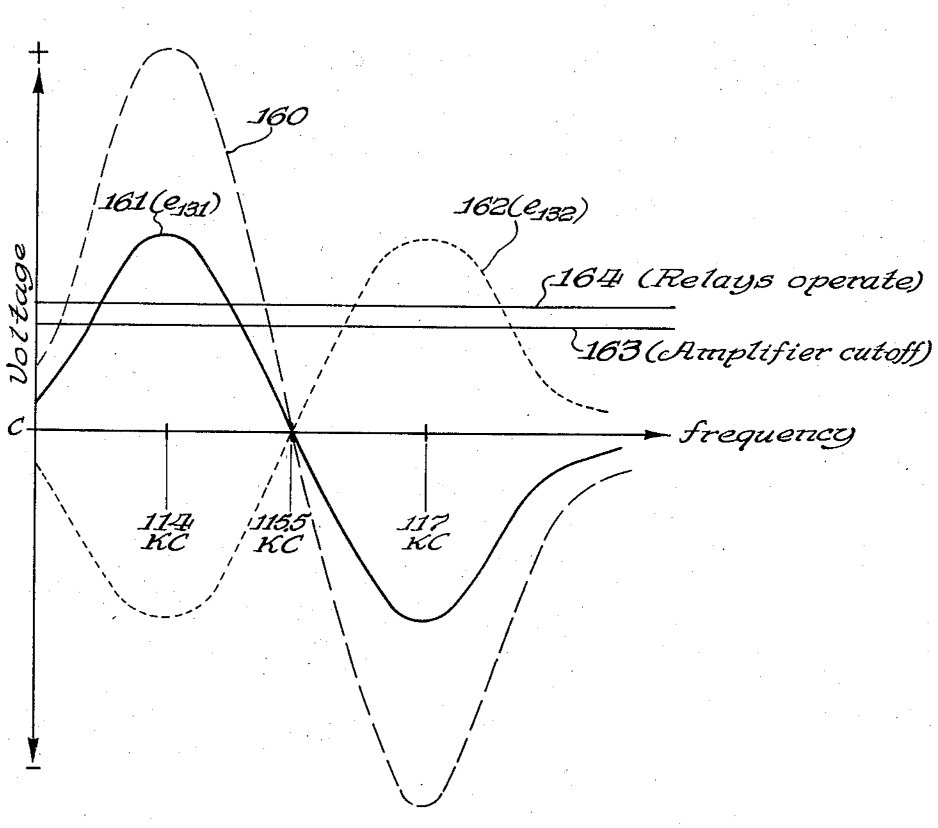

The features of the invention which are believed to be new are set forth with particularity in the appended claims. The invention, together with further objects and advantages thereof, may best be understood, however, by reference to the following description taken in conjunction with the accompanying drawings, in which:

Figure 1 is a detailed schematic diagram of circuitry including a preferred embodiment of a frequency-discriminator system constructed in accordance with the invention; and Figure 2 is an explanatory diagram showing certain operating characteristics for the frequency-discriminator circuit of Figure 2.

In Figure 1, microphone 62 is of the variable-capacitance type; one terminal of the microphone is grounded and the other is coupled to the control electrode 64 of a first amplifier tube such as a pentode 63 by means of an RC coupling circuit comprising a series capacitor 65 and further comprising a shunt resistor 66 connected between electrode 64 and ground. The microphone circuit also includes three series-connected resistors 67, 68 and 69 which connect microphone 62 back to the positive or B+ terminal of a control power supply 51. Cathode 70 of amplifier tube 63 is connected to ground through a bias resistor 71 which is bypassed by a capacitor 72. The suppressor electrode 73 of the tube is connected directly to the cathode, and the screen electrode 74 is connected to the B+ supply through a resistor 75, the screen being bypassed to ground through a capacitor 76.

The output circuit for tube 63 comprises a parallel-resonant circuit including an inductance 77 and a capacitor 78; the tuned circuit is connected in series between the anode 79 of tube 63 and the B+ supply. Anode 79 is also coupled to the control electrode 80 of the pentode section 81A of a combined pentode-triode by means of an RC coupling circuit comprising a series coupling capacitor 82 and a self-biasing resistor 83 which connects control electrode 80 to ground. Tube section 81A forms a part of the second stage of the input amplifier of the system and includes a cathode 84 which is connected directly to ground, the suppressor electrode 85 in this amplifier stage being connected directly to the cathode. The screen electrode 86 is coupled to a conventional biasing circuit comprising a resistor 87 which connects the screen electrode to the B+ supply and a capacitor 88 bypassing the screen electrode to ground.

The output circuit for amplifier section 81A is a conventional RC coupling circuit which couples the anode 90 of tube section 81A to the control electrode 91 of a triode tube section 81B. The coupling circuit includes a load resistor 92 connecting anode 90 to B+, a capacitor 93 and a resistor 94 connected in series between anode 90 and control electrode 91, and a coupling resistor 95 connecting the terminal of capacitor 93 opposite anode 90 to ground. Triode section 81B comprises the third and final stage of the input amplifier of the system and includes a cathode 96 which is connected to ground and an anode 97 connected to B+ through a load resistor 98. The circuit as thus far described constitutes input circuit 31 enclosed by a dotted rectangle in Figure 1.

Input circuit 31 is coupled to a signal translating stage, in the form of limiter circuit 34, by a coupling capacitor 100 connected in series between anode 97 of tube section 81B and the control electrode 101 of a limiter tube 102; the input circuit for tube 102 also includes a tuned circuit comprising an inductance 103 and a capacitor 104 connected in parallel with each other between control electrode 101 and ground. In the illustrated embodiment, tube 102 is of the gated-beam type commercially available under the type designation 6BN6. Limiter tube 102 includes a cathode 105 connected to ground through an unbypassed biasing resistor 106. The limiter tube further includes a pair of accelerating electrodes 107 and 108 disposed on opposite sides of control electrode 101; the two accelerating electrodes are connected to each other and are connected to the B+ supply through a resistor 109, being bypassed to ground by a capacitor 110. Tube 102 further includes a second control electrode 111 and an anode or output electrode 112; the second control electrode is not utilized in operation of the limiter and may be connected to anode 112 as shown or to ground.

Anode 112 of limiter tube 102 is returned to B+ through a circuit comprising two parallel-resonant circuits 115 and 116, each comprising an inductor and capacitor, connected in series with each other. The terminal of resonant circuit 115 connected to anode 112 is coupled to the electrical center of an inductance 117 through a coupling capacitor 118, and a capacitor 119 is connected in parallel with coil 117 to form a parallel-resonant circuit tuned to the same frequency as circuit 115. Coil 117 is also inductively coupled to the inductance coil of tuned circuit 115. The opposite terminals of coils 117 are respectively connected to the two anodes 120 and 121 of a double diode 122. The cathode 123 of tube 122 associated with anode 121 is connected back to the electrical midpoint of coil 117 through a resistor 124, and the cathode 126 associated with anode 120 is returned to the same point through a resistor 127. Cathodes 123 and 126 are bypassed to ground by capacitors 129 and 130 respectively and are returned to a source of neagtive operating potential C− in control power supply 51 through two equal resistors 131 and 132 respectively. Tube 122 is thus incorporated in a conventional balanced frequency-discriminator circuit frequently used as a detector for frequency-modulated signals. In the present instance, however, the balanced frequency discriminator is used in a somewhat different manner than in conventional practice, as will be made more apparent in the operational description of the system included hereinafter.

The frequency-discrimination device comprising tube 122 forms a part of a first segregation network 35; network 35 also includes further means for distinguishing between desired and undesired output signals from limiter 34 on the basis of duration and duty cycle of the received signal. A pair of resistors 133 and 134 are connected in series with each other and with cathode 123 of tube 122, and a similar pair of resistors 135 and 136 are connected in series with each other and with cathode 126. The common terminal of resistors 133 and 134 is bypassed to the common terminal of resistors 135 and 136 by a capacitor 137; the other terminal of resistor 134 is bypassed to ground through a capacitor 138, whereas the corresponding terminal of resistor 136 is bypassed to ground through a capacitor 139. Resistors 133–136 and capacitors 137–139, together with resistors 131 and 132, constitute a pair of integrating networks for developing potentials indicative of the average amplitudes of the signals appearing at the cathodes of the frequency discriminator comprising tube 122.

Network 35 further includes a threshold device or amplifier comprising a double triode 140. The two cathodes 141 and 142 of tube 140 are grounded; the control electrode 143 associated with cathode 141 is connected to the common terminal of resistor 134 and capacitor 138, whereas the control electrode 144 associated with cathode 142 is similiarly connected to the common terminal of resistor 136 and capacitor 139. The anode 145 of tube 140 associated with cathode 141 and control electrode 143 is returned to B+ through the operating coil 147 of a muting relay 37. Similarly, the other anode 148 of tube 140 is connected to the B+ supply through the operating coil 149 of an on-off relay 38.

Tuned circuit 116 is incorporated in a second segregation network 36 which is similar in construction to network 35. Network 36 comprises a second tuned circuit 150, including inductor **117*a* and capacitor 119*a*, coupled to a double diode 151 and to resonant circuit 116 by capacitor 118*a* and mutual inductance in the same manner as in discriminator 35; the two cathodes of tube 151 are connected to a dual integrating network 152 which in turn controls operation of a threshold amplifier comprising a double triode 153. One of the anodes 154 of amplifier tube 153 is connected to the B+ supply through the operating coil 155 of a clockwise-motor-control relay 39, whereas the other output electrode 156 of tube 153 is returned to B+ through the operating coil 158 of a counter-clockwise-motor-control relay 40**; a full description of the purpose and function of the relays is contained in the aforesaid copending application.

In operation, an acoustic signal impinging upon microphone 62 effectively varies the microphone capacitance and excites the three-stage amplifier comprising tubes 63, 81A, and 81B. The electrical signal variations provided by the microphone are first amplified in tube 63, the tuned output circuit 77, 78 of the tube providing for substantial attenuation of most frequency components outside of the selected acoustic frequency range of the system (38 to 41 kilocycles in the present example). The electrical signal from amplifier tube 63 is further amplified in tubes 81A and 81B and constitutes the input signal applied to limiter tube 102. Further frequency selection is provided by the parallel-resonant circuit 103, 104 in the input circuit of the limiter.

Limiter 34, comprising tube 102, performs two distinct functions. It operates as a limiting amplifier, providing an output signal of constant amplitude over a wide range of input signal amplitudes. The tube selected for this limiter must have an output electrode current vs. control electrode voltage characteristic comprising two control electrode voltage ranges of substantially zero transconductance separated by a control electrode voltage range of high transconductance, a characteristic best achieved by a gated-beam tube such as the 6BN6 but also attainable in other conventional devices such as the 6BE6 or 6BU8. With a tube and circuit exhibiting this characteristic, the limiter functions also as a harmonic generator and provides substantial output signals at the third and fifth harmonics of the input signal. The structure and operation of a harmonic generator of this type are described in detail in U. S. Patent No. 2,681,994 to Robert Adler, filed September 27, 1949, issued June 22, 1954, and assigned to the same assignee as the present invention. Accordingly, a detailed description of operation of the limiter circuit is unnecessary here. It is sufficient to indicate that the limiter develops an amplitude-limited signal having a frequency which is an integral multiple of the input signal frequency; in the illustrated embodiment, the third harmonic of the input signal frequency is utilized for reasons indicated hereinafter. Any other type of limiter may of course be substituted for the illustrated device, particularly where the discriminators of the system are constructed to operate at the fundamental frequency of the output signal from limiter 34. Moreover, it should be understood that one stage of the amplifier of circuit 31 may be constructed as a frequency multiplier, in which case circuit 34 may function only as a limiter.

The amplitude-limited signal from limiter 34 is supplied to the tuned circuits 115 and 116 of the discriminators included in networks 35 and 36 respectively. The two discriminator input circuits are preferably connected in series as illustrated; this is possible because they are tuned to substantially different frequencies and each represents a relatively low impedance at the resonant frequency of the other. In the overall system, as fully described in the aforesaid copending application, four acoustic signals of different frequency are utilized for four different control functions; the frequencies selected, may, for example, be 38, 39, 40, and 41 kc. respectively. With these operating frequencies, parallel-resonant circuit 115 may be tuned to a frequency of 38.5 kc., the center frequency between the two lower-frequency signals, in which case resonant circuit 116 is tuned to 40.5 kc., the median for the two higher-frequency signals. Operation in this case is predicated upon use of the fundamental component of the output signal from limiter 34. Operation on the fundamental, however, presents difficult problems in feedback between the circuit elements, particularly the inductances, of discriminator devices 35 and 36 and the different stages of the input amplifier circuit, particularly the tuned circuit 77, 78 incorporated in the output circuit of amplifier tube 63. The possibility of such regeneration difficulty is apparent from the fact that the relatively low frequencies involved make magnetic shielding difficult and expensive and the further fact that amplification in the system must be extremely high in order to provide for use of relatively weak acoustic triggering signals. Consequently, in the preferred system illustrated resonant circuit 115 is tuned to 115.5 kc., the third harmonic of the median frequency for the two lower-frequency signals. Similarly, circuit 116 is constructed to have a resonant frequency of 121.5 kc., the third harmonic of the median for the two higher-frequency trigger signals.

In accordance with the usual construction of frequency discriminators, the resonant circuit comprising coil 117 and capacitor 119 is tuned to the same frequency (115.5 kc.) as resonant circuit 115 and the coils of the two circuits are disposed in mutual coupling relationship. Consequently, the discriminator comprising the two tuned circuits, tube 122, coupling capacitor 118 and resistors 124 and 127 has an operating characteristic as illustrated by dash line 160 in Figure 2, in which the voltage appearing across cathodes 123 and 126 is plotted as a function of the frequency of the signal applied to tuned circuit 115 from limiter 34. Curve 160 is representative of the magnitude of that voltage; however, it should be understood that the polarity is arbitrarily selected. As drawn, the curve represents the potential of cathode 123 with respect to cathode 126; if cathode 123 had, instead, been chosen as potential reference, curve 160 would appear reversed. Resistors 131 and 132, of substantially equal resistance are connected in series across the two cathodes 123 and 126, their common terminal being returned to the C— reference voltage. Half the discriminator output voltage, therefore, appears across each of these resistors. The voltage across resistor 131 is plotted in Figure 2 as a function of the frequency of the signal applied to the discriminator, being illustrated by solid line 161; its amplitude is approximately half that of the total discriminator output voltage and includes values both positive and negative with respect to the C— reference voltage to which the common terminal of resistors 131 and 132 is returned. The voltage across resistor 132 illustrated by dotted line 162, follows a characteristic essentially similar to that of curve 161 except that the polarity with respect to the bias voltage is reversed.

The circuit parameters for the discriminator circuits are so selected that the two peaks of each of voltage characteristic curves 160—162 are centered at 114 and 117 kc. respectively, these frequencies being the third harmonics of the two acoustic frequencies (38 and 39 kc.) employed to actuate this portion of the control system. In conventional use of the discriminator circuit as a detector for frequency-modulated signals, only the relatively linear portion of characteristic 160 centered about the median or resonant frequency of 115.5 kc. would be employed. In the present instance, however, the effective operating range for the frequency discriminator is restricted to two narrow portions, each including one of the two peaks at 114 and 117 kcs. to enable the system to distinguish between these two frequencies and to discriminate against other frequencies outside the two operating ranges. For this reason, the two threshold amplifier sections coupled to cathodes 123 and 126 are biased to be normally cut off except when the input signal from the discriminator exceeds a predetermined amplitude. The cut-off level for the amplifier is indicated by dash line 163 in Figure 1. A somewhat higher amplitude, indicated in Figure 2 by line 164, is required to operate relays 37–40 (Figure 1), since a minimum current is required to actuate the relays. The requisite negative bias in the illustrated embodiment is provided by the connection of the common terminal of resistors 131 and 132 to the negative source C— of control power supply 51.

Under well-controlled environmental conditions, it is only necessary to distinguish between the components of the amplitude-limited signal from limiter 34 on the basis of frequency, in which case the threshold amplifier or amplitude-discriminator device comprising double triode 140 may be connected directly to resistors 131 and 132 without providing the intervening integrating network shown in the preferred embodiment. The control system may then be triggered, however, by extraneous ultrasonic signals having a frequency approximately equal to the selected acoustic operating frequencies or by noise at approximately 114 kc. or 117 kc. in the output from limiter 34. In a more normal environment, the system might thus be triggered into spurious operation by acoustic signals of very short duration produced by the jingling of coins or keys or from other sources. The system might also be falsely actuated by intermittent signals within the operating acoustic frequency ranges. In order to avoid this possibility of malfunction of the system and take advantage of the slow decay of the ultrasonic signal produced by the preferred transmitter described and claimed in the aforesaid copending application, the integrating network is utilized to average the output signal from the frequency discriminator comprising tube 122 over a predetermined period of time, preferably somewhat shorter than the time constant of the acoustic transmitter. It will suffice for purposes of the present application to say that by properly selecting the circuit parmeters for the integrating network and the threshold or firing levels for the two sections of amplifier tube 140, segregation network 35 may be made responsive only to signals of predetermined minimum duration and duty cycle.

The present invention is directed to a problem discovered in the circuit illustrated in Figure 1. This problem consists of an unbalance between the output signals developed by the two frequency discriminator circuits. It was found that this unbalance is caused by the reactance presented at the output of stage 34, principally comprising the plate-to-ground capacitance of limiter tube 102. This lack of balance between the two frequency discriminators can be substantial and can present a severe problem in the control system receiver. It has been discovered that balance can be achieved by coupling the discriminator inputs together with a reactive impedance substantially equal in magnitude and opposite in sign to the reactive impedance across the output of the common preceding stage 34. To this end, the discriminators of networks 35 and 36 are constructed to effectively neutralize this capacitive effect by suitable positioning of the inductance coils of the frequency discriminator tuned circuits. In essence, this is accomplished by locating the coils of resonant circuits 115 and 116 relatively close to each other and with connections of proper polarity so that a mutual inductance 180, indicated by dashed lines in Figure 1, links the two frequency discriminators to effectively compensate for the plate capacitance of the limiter tube. Of course, complete compensation or neutralization can be had at only one particular frequency; it has been found, however, that substantial compensation, sufficient for practical purposes, is achieved by matching the reactances at a frequency in the vicinity of the control-signal frequencies and preferably intermediate the resonant frequencies of tuned circuits 115 and 116.

In one satisfactory construction employed for this purpose, the four coils of the discriminator circuits are all aligned in a single row, the two inside coils constituting the inductances of circuits 115 and 116. With this arrangement, the coil spacing is adjusted to provide the necessary controlled coupling and, if there is insufficient space available in the control receiver chassis to avoid overcoupling, excess mutual coupling is compensated by adding a relatively small capacitor between limiter tube anode 112 and ground. Merely by way of further illustration and in no sense by way of limitation, an exemplary construction included the following circuit components:

| | |
|---|---|
| Tube **102** | 6BN6 |
| R**106** | 220 ohms |
| R**109** | 47,000 ohms |
| C**110** | 0.01 $\mu$f |
| C**115**, **116**, **119**, **119***a* | 680 $\mu\mu$f |
| C**118**, **118***a* | 100 $\mu\mu$f |
| R**124**, **127** | 2.2 M ohms |
| Tubes **122** and **151** | 6AL5 |
| C**129**, **130** | 0.001 $\mu$f |
| R**131**, **132** | 2.2 M ohms |

In addition, coils 115, 116, 117 and 117*a* are wound on the central ¾ inch of a 1¾ inch long insulator tube having an external diameter of 0.280 inch and constructed internally to receive a ferrite core ¾ inch long and bearing a 28 pitch, V-shaped (U. S. S.) thread of 0.236 inch outer diameter; the ferrite cores are formed with a 0.105 inch hexagonal hole running lengthwise therethrough to facilitate tuning. Coils 115 and 116 are wound with approximately 385 turns of #36 polyurethane-coated copper wire to provide an inductance at 1 kilocycle of about 457 microhenries and a Q at 790 kilocycles of about 45, both measurements being taken with the core removed. Coils 117 and 117*a* are wound with approximately 385 turns of the same wire to give the same measurements and are tapped at about the 164th turn.

The thus fabricated coils are mounted parallel to one another in a row with the two inside coils 115 and 116 spaced $^{15}/_{16}$″ center-to-center and the outside coils 117 and 117*a* each spaced one inch center-to-center from the adjacent inside coil. So arranged, the amount of mutual coupling between coils 115 and 116 is more than needed for proper compensation of the stage 34 output reactance; consequently, an additional capacitance of 8.2 micro-microfarads is connected between anode 112 and the junction between resistor 109 and the B+ supply, effectively a ground for signal frequencies, with the result that balanced operation of networks 35 and 36 is obtained. Of course, the terminals of coils 115 and 116 must be connected in series in the proper order to obtain the necessary mutual coupling; this is readily determined in this instance by measuring the total inductance across the two coils connected one way in series and then with the terminals of one of the coils reversed, the correct connection being that which results in the lower total inductance.

It is to be understood that frequency-selective devices other than conventional discriminators may be coupled to the output circuit in place of those shown in Figure 1. For instance, tuned circuits 117–119 and 150 may be omitted and rectifier means may be connected directly to tuned input circuits 115 and 116; because of the capacity existing across the output circuit of the preceding stage, the tuned input circuits will be undesirably coupled with each other. This undesirable coupling is eliminated, according to the invention, by providing a coupling inductance, which may be in the form of a physical inductor or of a coupling link but preferably is achieved by mutual coupling, to compensate for the capacity. Accordingly the term frequency-discrimination device as used in the specification and claims is to be construed to define a circuit having frequency-selective properties.

The system of the present invention permits the coupling of a plurality of frequency-discrimination devices to but a single preceding stage while achieving balanced operation of the discriminators. Moreover, the advantages of invention may be realized with a minimum of additional components and, with proper physical arrangement, with no additional components whatsoever. The coupling network is extremely simple whereby tuning and matching problems are minimized, and the entire assembly is capable of being manufactured as a compact, economical unit.

While a particular embodiment of the present invention has been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

We claim:

1. A frequency-discrimination system comprising: means, including an output circuit presenting thereacross a predetermined reactive impedance at a predetermined frequency, for developing a plurality of control signals at frequencies within a selected range of frequencies including said predetermined frequency; a first frequency-discrimination device, responsive to control signals at frequencies within a first portion of said range, coupled to said output circuit; a second frequency-discrimination device, responsive to control signals at frequencies within a second portion of said range, coupled to said output circuit; and means coupled to said first and second frequency-discrimination devices for introducing a compensating reactive impedance substantially equal in magnitude and opposite in sign, at said predetermined frequency, to said predetermined reactive impedance; and utilization means coupled to the outputs of said frequency-discrimination devices.

2. A frequency-discrimination system comprising: means, including an output circuit presenting thereacross a predetermined capacitive impedance at a predetermined frequency, for developing a plurality of control signals at frequencies within a selected range of frequencies including said predetermined frequency; a first frequency-discrimination device, responsive to signals at frequencies within a first portion of said range, coupled to said output circuit; a second frequency-discrimination device, responsive to signals at frequencies within a second portion of said range, coupled to said output circuit; and means coupled to said first and second frequency-discrimination devices for introducing a compensating inductive impedance of a magnitude sufficient, at said predetermined frequency, to substantially neutralize said capacitive impedance; and utilization means coupled to the outputs of said frequency-discrimination devices.

3. A frequency-discrimination system comprising: means, including an output circuit presenting a predetermined reactive impedance thereacross at a predetermined frequency, for developing a plurality of signals at frequencies within a selected range of frequencies including said predetermined frequency; a first frequency-discrimination device, including a first tuned input circuit resonant at one frequency within said range, coupled to said output circuit; a second frequency-discrimination device including a second tuned input circuit, resonant at another frequency within said range, coupled to said output circuit; and means included in said first and second tuned input circuits for introducing a compensating reactive impedance substantially equal in magnitude and opposite in sign, at said predetermined frequency, to said predetermined reactive impedance; and utilization means coupled to the outputs of said frequency-discrimination devices.

4. A frequency-discrimination system comprising: means, including an output circuit presenting a predetermined reactive impedance thereacross at a predetermined frequency, for developing a plurality of control signals at frequencies within a selected range of frequencies including said predetermined frequency; a first frequency-discrimination device including a first tuned input circuit resonant at one frequency within said range; a second frequency-discrimination device including a second tuned input circuit, resonant at another frequency within said range, coupled in series with said first tuned input circuit across said output circuit; and means coupled to said first and second frequency-discrimination devices for introducing a compensating reactive impedance substantially equal in magnitude and opposite in sign, at said predetermined frequency, to said predetermined reactive impedance; and utilization means coupled to the outputs of said frequency-discrimination devices.

5. A frequency-discrimination system comprising: means, including an output circuit presenting a predetermined reactive impedance thereacross at a predetermined frequency, for developing signals at one pair of different frequencies above and another pair of different frequencies below said predetermined frequency; a first frequency-discrimination device including a first tuned input circuit resonant at a first frequency intermediate said one pair of frequencies; a second frequency-discrimination device including a second tuned input circuit, resonant at a second frequency intermediate said other pair of frequencies, coupled in series with said first tuned input circuit across said output circuit; and means coupled to said first and second frequency-discrimination devices for introducing a compensating reactive impedance substantially equal in magnitude and opposite in sign, at said predetermined frequency, to said predetermined reactive impedance; and utilization means coupled to the outputs of said frequency-discrimination devices.

6. A frequency-discrimination system comprising: means, including an output circuit presenting a predetermined capacitive impedance thereacross at a predetermined frequency, for developing a plurality of control signals at frequencies within a selected range of frequencies including said predetermined frequency; a first frequency-discrimination device including a first tuned input circuit resonant at one frequency within said range; a second frequency-discrimination device including a second tuned input circuit, resonant at another frequency within said range, coupled in series with said first tuned input circuit across said output circuit; and means coupled to said first and second frequency-discrimination devices for introducing a compensating inductive impedance substantially equal in magnitude, at said predetermined frequency, to said capacitive impedance; and utilization means coupled to the outputs of said frequency-discrimination devices.

7. A frequency-discrimination system comprising: means, including an output circuit presenting thereacross a predetermined capacitive impedance at a predetermined frequency, for developing a plurality of signals at frequencies within a selected range of frequencies including said predetermined frequency; a first frequency-discrimination device, including a first tuned input circuit resonant at a first frequency within said range and comprising a coil and a capacitor, included in said output circuit; a second frequency-discrimination device including a second tuned input circuit, resonant at a second frequency within said range, comprising a coil and a capacitor included in said output circuit, with its coil spaced a sufficient distance from and oriented with respect to the coil of said first tuned input circuit to effect mutual inductive coupling therewith of an amount to substantially neutralize said capacitive impedance at said predetermined frequency; and utilization means coupled to the outputs of said frequency-discrimination devices.

8. A frequency-discrimination system comprising: means, including an output circuit presenting thereacross a predetermined capacitive impedance at a predetermined frequency, for developing a plurality of signals at frequencies within a selected range of frequencies including said predetermined frequency; a first frequency-discrimination device, including a first tuned input circuit resonant at a first frequency within said range, included in said output circuit; a second frequency-discrimination device including a second tuned input circuit, resonant at a second frequency within said range, coupled in series with said first tuned input circuit in said output circuit and mutually intercoupled with said first tuned input circuit to produce an inductive impedance across said output circuit substantially equal in magnitude, at said predetermined frequency, to said predetermined capacitive impedance; and utilization means coupled to the outputs of said frequency-discrimination devices.

References Cited in the file of this patent

UNITED STATES PATENTS

| | | |
|---|---|---|
| 2,285,957 | Wheeler | June 9, 1942 |
| 2,310,304 | McCoy et al. | Feb. 9, 1943 |
| 2,333,992 | Fox | Nov. 9, 1943 |
| 2,510,139 | Purlington | June 6, 1950 |
| 2,817,025 | Adler | Dec. 17, 1957 |